Aug. 23, 1938.   J. W. ANDERSON   2,128,068
WINDSHIELD WIPER ARM
Filed Nov. 15, 1935
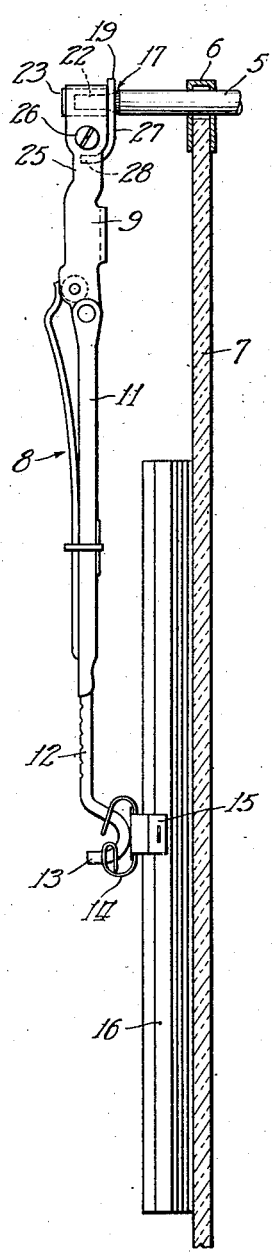
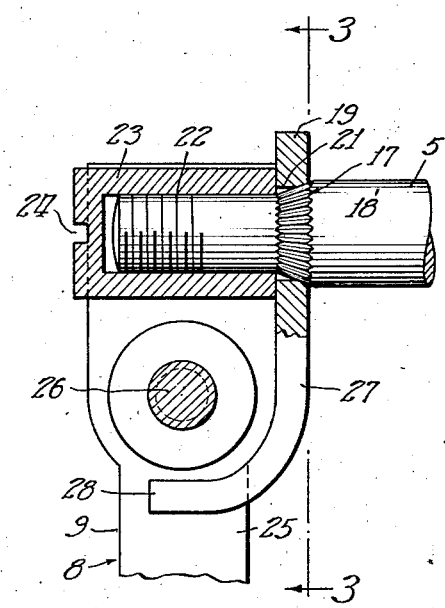
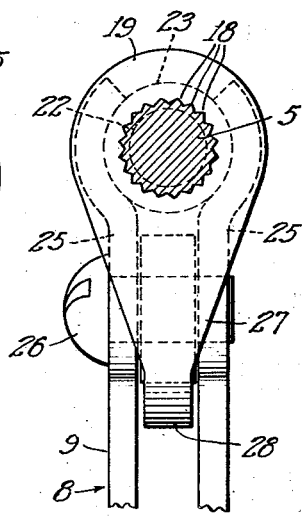
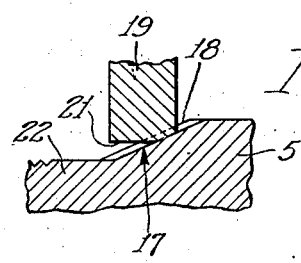
Inventor:
John W. Anderson
By:
Hill & Hill
Attys
Witness:
V. Filyander Patented Aug. 23, 1938

2,128,068

UNITED STATES PATENT OFFICE 2,128,068

WINDSHIELD WIPER ARM

John W. Anderson, Gary, Ind., assignor to Productive Inventions, Inc., Gary, Ind., a corporation of Indiana Application November 15, 1935, Serial No. 49,995

7 Claims. (Cl. 287—52.02)

This invention relates to a windshield wiper, and particularly to the arm mounting therefor, by which the arm and wiping element are supported and operatively connected to an actuating member such as a shaft or other suitable device.

One object of the present invention is to provide means whereby a wiper arm may be readily connected to and disconnected from its actuating member.

Another object of the invention is to provide a structure wherein the means for attaching or securing the wiper arm to the actuating member is retained against accidental displacement and possible loss of the arm and its associated parts.

Another object of the invention is to provide a structure whereby the wiper arm may be positively retained in various positions of annular adjustment with respect to the actuating member or shaft.

A further object of the invention is to provide means whereby positive operation of the wiper arm by the actuating member is assured.

A still further object of the invention is to improve devices of the character described in sundry details hereinafter referred to and particularly pointed out in the appended claims.

One embodiment of the present invention is shown for illustrative purposes in the accompanying drawing, in which:

Fig. 1 is a side elevational view of my improved wiper arm mounting illustrating its application to a wiper arm and actuating member operatively related to a windshield;

Fig. 2 is an enlarged fragmentary sectional elevational view of the improved mounting and a portion of the arm shown in Fig. 1;

Fig. 3 is a transverse sectional elevational view taken substantially as indicated by the line 3—3 of Fig. 2;

Fig. 4 is a further enlarged fragmentary sectional elevational view of a portion of the structure shown in Fig. 2, and illustrating the relationship of certain portions of the device with respect to each other.

In the drawing, the present invention is shown as applied to an actuating member shown, in the present instance, as a shaft 5 rotatably mounted in a frame 6 of a windshield 7, and to a wiper arm, indicated as a whole by the numeral 8, carried by the shaft 5, the arm 8 being shown, in the present instance, as comprising an inner section 9 connected rigidly to the shaft 5, an intermediate section 11 pivotally mounted on the inner section 9, and an outer section 12 slidably mounted on the intermediate section 11 (as fully described in the copending application of myself and Theodore J. Smulski, filed December 9, 1931, Serial No. 579,874), the outer section 12 of the arm 8 being provided with a hook-like portion 13 adapted to engage a connector 14, on which is mounted a clip or holder 15 adapted to receive a windshield wiper element or blade 16 positioned adjacent and adapted for engagement with the surface of the windshield 7.

For operatively connecting the arm 8 to the actuating member, the shaft 5 is provided with a roughened tapered portion or shoulder 17 shown, in the present instance, as provided with a plurality of elongated annularly spaced teeth 18 adapted to be engaged by a key member 19 adjacent an aperture 21 formed therein, the aperture 21 being of a diameter slightly smaller than the outside diameter of the shaft portion 5.

For urging and securing the key member 19 against the teeth 18 of the tapered shoulder 17, the shaft 5 is provided with a reduced portion 22 having screw-threads formed thereon adapted to receive a screw-threaded clamping member 23, shown, preferably, in the present instance, as of substantially cylindrical form, and provided with a screw driver slot 24 or the equivalent by which the member 23 may be rotated on the reduced portion 22.

As clearly shown in Fig. 3, the inner section 9 of the arm 8 is provided with spaced bifurcations 25 adapted to be positioned on opposite sides of the clamping member 23 and secured thereto at opposite sides thereof by a screw-threaded bolt 26 extending through the bifurcated portions 25 of the inner arm section 9 in a manner to draw the bifurcations 25 toward each other, and providing a suitable driving connection between the key member 19 and the arm 8, the key member is provided with a laterally extending finger 27 having a portion 28 adjacent its lower end positioned between the bifurcations 25 in a manner to exert a driving force against one or the other of the bifurcations as the shaft 5 is rotated in one direction or another.

By such an arrangement, it will be apparent that an efficient driving connection is provided between the actuating member or shaft 5 and the wiper arm 8 by reason of the key member 19 being forced against the roughened tapered shoulder 17 by means of the clamping member 23 in a manner to cause the teeth 18 to bite into the material of the key member surrounding the aperture 21 and by reason of the portion 28 of the finger 27 being positioned between the bifurcations 25 and the bifurcations being rigidly secured to the clamping member 23 by means of the bolt 26, the clamping member 23 and arm 8 are securely held against accidental displacement with respect to the key member 19 and shaft 5, and by reason of such an arrangement, it will be apparent that a positive and most efficient driving connection is provided between the actuating member or shaft 5 and the wiper arm 8.

Obviously, the present invention is not limited to the precise construction and arrangement shown and described as the same may be variously modified. Moreover, all the features of the invention need not be used conjointly as the same may be used to advantage in variously different combinations and subcombinations.

What I claim as new and desire to secure by Letters Patent is:

1. In a device of the class described and in combination, an actuating member having a shoulder thereon, a key member engaging said shoulder, clamping means mounted on said actuating member and engaging said key member for urging the key member against said shoulder, a wiper arm secured to said clamping means, and means carried by said key member and engaging a portion of said arm for providing a driving connection between said key member and arm.

2. In a device of the class described and in combination, an actuating member having a tapered shoulder thereon and having a screw-threaded portion adjacent said shoulder, a key member engaging said shoulder, a screw-threaded clamping member mounted on the threaded portion of said actuating member and engaging said key member for securing the key member against said shoulder, a wiper arm rigidly secured to said clamping member, and a finger carried by said key member and engaging a portion of said arm for providing a driving connection between said key member and arm.

3. In a device of the class described and in combination, an actuating shaft having a tapered shoulder thereon and having a screw-threaded portion adjacent said shoulder, a key member mounted on said shaft and engaging said shoulder, a screw-threaded clamping member mounted on the threaded portion of said shaft and engaging the key member for securing the key member against said shoulder, a bifurcated wiper arm rigidly secured to said clamping member, and a finger carried by said key member and positioned between the bifurcations of said arm for providing a driving connection between said key member and arm.

4. In a device of the class described and in combination, an actuating shaft having a tapered shoulder thereon and having a screw-threaded portion adjacent said shoulder, a key member mounted on said shaft and engaging said shoulder, a screw-threaded clamping member mounted on the threaded portion of said shaft and engaging the key member for securing the key member against said shoulder, a bifurcated wiper arm mounted on said clamping member, means carried by said arm for securing the bifurcations thereof against the side of said clamping member, and a finger formed integrally with said key member and positioned between the bifurcations of said arm for providing a driving connection between said key member and arm.

5. In a device of the class described and in combination, an actuating shaft having a tapered shoulder thereon and having a screw-threaded portion adjacent said shoulder, a plurality of elongated annularly spaced teeth on said shoulder, a key member mounted on said shaft and engaging the teeth on said shoulder, a screw-threaded clamping member mounted on the threaded portion of said shaft and engaging the key member for forcing the key member against the teeth of said shoulder, a bifurcated wiper arm rigidly secured to said clamping member, and a finger carried by said key member and positioned between the bifurcations of said arm for providing a driving connection between said key member and arm.

6. In a device of the class described and in combination, an actuating shaft, a key member mounted thereon, a rotatable clamping member mounted on said shaft and engaging said key member for securing the latter against relative displacement with respect to the shaft, a wiper arm rigidly secured to said clamping member, and a laterally extending portion carried by said key member and engaging said arm for retaining said arm and clamping member against relative displacement with respect to each other and to said key member and shaft.

7. In a device of the class described and in combination, an actuating shaft having an outer annular portion of irregular contour, a key member having an opening formed therein, the annular wall of said opening being irregular and conforming substantially to the irregular contour of said outer portion of the shaft, a bifurcated wiper arm carried by and operatively related to said shaft in a manner to be driven thereby, and a laterally extending finger on said key member positioned between the bifurcations of said arm for providing a driving connection between said key member and arm.

JOHN W. ANDERSON.